United States Patent
Ehlinger et al.

(10) Patent No.: US 7,394,345 B1
(45) Date of Patent: Jul. 1, 2008

(54) ARRANGEMENT FOR INDICATING PRESENCE OF INDIVIDUAL

(75) Inventors: James C. Ehlinger, Colts Neck, NJ (US); Christopher P. Gilboy, Freehold, NJ (US); Marius J. Gudelis, Holmdel, NJ (US)

(73) Assignee: AT&T Corp., New York, NY (US)

( * ) Notice: Subject to any disclaimer, the term of this patent is extended or adjusted under 35 U.S.C. 154(b) by 569 days.

(21) Appl. No.: 10/730,587

(22) Filed: Dec. 8, 2003

(51) Int. Cl.
 *G05B 23/00* (2006.01)
 *H04M 11/04* (2006.01)
 *H04M 3/42* (2006.01)
 *H04B 7/00* (2006.01)

(52) U.S. Cl. .................. 340/5.21; 340/5.8; 340/7.1; 340/7.5; 379/37; 379/38; 379/39; 379/45; 379/201.02; 379/201.1; 455/515; 455/521

(58) Field of Classification Search .................. None
See application file for complete search history.

(56) References Cited

U.S. PATENT DOCUMENTS

| | | | |
|---|---|---|---|
| 6,574,480 B1 | 6/2003 | Foladare et al. | |
| 6,654,815 B1 | 11/2003 | Goss et al. | |
| 6,700,966 B2 * | 3/2004 | Takagi et al. | 379/201.06 |
| 7,116,971 B2 * | 10/2006 | Chapman et al. | 455/412.1 |
| 2001/0056435 A1 * | 12/2001 | Quick | 707/104.1 |
| 2002/0085701 A1 * | 7/2002 | Parsons et al. | 379/211.01 |
| 2002/0145559 A1 | 10/2002 | Sullivan | |
| 2003/0050038 A1 * | 3/2003 | Haave et al. | 455/404 |
| 2003/0112956 A1 | 6/2003 | Brown et al. | |
| 2005/0180734 A1 | 8/2005 | Ochiai et al. | |
| 2005/0184853 A1 * | 8/2005 | Payne et al. | 340/5.2 |

* cited by examiner

*Primary Examiner*—Julie Bichnogoc Lieu

(57) ABSTRACT

When an entity (such as a customer using a communication device 131, 141, 151 . . . ) attempts to communicate with a target (such as an employee), an arrangement indicates to the customer, "status" information describing at least the employee's present and future ability to communicate with the entity (such as by returning his call). At least one sensing device 111-119 is configured to provide sensing information concerning the target employee's status in response to an action of the target employee with respect to the sensing device. A monitoring server 102 is configured to receive the sensing information and to govern communication to the entity (customer) of the target's "status." In one implementation, a particular sensing device (such as a cash register 111, computer terminal 112, or time clock 113) is configured to perform both (A) a primary function that is not related to providing the sensing information, and (B) the secondary function of providing the sensing information. In this implementation, the particular sensing device provides the sensing information in response to the person's ordinary use of the particular sensing device as he goes about his job (performing the particular sensing device's primary function), so that the person does not have to explicitly perform any purely presence-related action in order to cause the particular sensing device to communicate the sensing information.

3 Claims, 3 Drawing Sheets

ARRANGEMENT FOR INDICATING PRESENCE OF INDIVIDUAL

BACKGROUND OF THE INVENTION

1. Field of the Invention

The invention generally relates to arrangements for indicating the presence of a "target" such as an individual. More particularly, the invention relates to arrangements for communicating "status" information describing at least the target's present and future ability to communicate with the entity (such as by returning a call).

2. Related Art

Businesses are always looking for ways to develop better rapport between their employees and their customers, to improve overall customer service. One way of achieving this rapport is to facilitate a customer's communication with a given employee. For example, a customer may wish to easily communicate with a particular plumbing expert at a large hardware store on an ongoing basis. The customer's wish may result from a personal trust, or may be based on the particular employees knowledge or expertise.

Conventionally, businesses provide voicemail service so that customers may attempt to reach their trusted employee. However, voicemail systems cannot provide the customer with a reliable indication of whether the employee is in or is reachable in the near future. Moreover, a voicemail message may not be often checked or the employee may be on vacation, resulting in a delayed return call that causes the customer to be dissatisfied.

It is recognized that employees may be instructed to keep their voicemail greetings current so that callers will be warned of any delays or absences. However, this instruction is not always followed because it requires the employee to remember to do so. Moreover, employees may be negligent in checking voicemail, also causing delays that are frustrating to customers who call. Human error or negligence can thus be responsible for diminishing customer satisfaction.

A common alternative to voicemail systems is to have a customer's call forwarded to a central operator who can then explicitly page the employee who is being called. However, this paging practices requires human intervention, and forces the calling customer to wait, regardless of whether or not the employee responds to the page. Further, employment of a live central operator increases personnel costs, a result that is contrary to the intent of automated voicemail systems.

Various features have been proposed in the art. In reverse chronological order by issue date or publication date:

U.S. Pat. No. 6,654,815 (Goss et al.) discloses a contact server for a call center in which customers use various communications technologies to submit a call-back request via the Internet; however, Goss' call-back request arrangement does not appear to tell the customer whether the called employee is present or can call back soon.

U.S. Patent Application Publication No. 2003/0112956 (Brown et al.) discloses a system that automatically forwards calls to a backup party selected in accordance with a context for the call; however, Brown's arrangement does not appear to tell the caller whether the called employee is present or can call back soon.

U.S. Pat. No. 6,574,480 (Foladare et al.) discloses an arrangement for paging an intelligently chosen destination device when a call or other communication is received, based on the identity of a customer and the reason for the communication; however, the Foladare's arrangement does not appear to inherently provide information back to the caller.

U.S. Patent Application Publication No. 2002/0145559 (Sullivan) discloses how a person's location may be tracked using a global positioning system (GPS) device; however, Sullivan's device does not solve the larger problem of communicating information about the person's presence to a calling customer.

Finally, U.S. Patent Application Publication No. 2002/0085701 (Parsons et al.) discloses a unified communication management system that maintains presence data relating to a person's location, and uses that presence data and context data to automatically forward calls from one of the person's communication's devices to another or to another individual. Parsons' paragraph [0036] focuses on manual and automatic ways in which the person's location may be tracked. However, Parsons' arrangement does not appear to tell the caller whether the called person is present or can call back soon.

Accordingly, there is a need in the art for an arrangement that would allow customers to quickly and automatically receive a reliable, timely and accurate indication of whether an employee is present at a given time, and when the customer might expect the employee to call back. Preferably, the arrangement would provide this information without requiring the affirmative action of the employee being sought, to remove human error.

SUMMARY

When an entity (such as, for example, a customer) attempts to communicate with a target (such as an employee), an arrangement indicates to the entity, "status" information describing at least the target's present and future ability to communicate with the entity (such as by returning his call). At least one sensing device is configured to provide sensing information concerning the target's status in response to an action of the target with respect to the sensing device. A monitoring unit is configured to receive the sensing information and to govern communication of the target's "status" to the entity.

BRIEF DESCRIPTION OF THE DRAWINGS

A more complete appreciation of the described embodiments is better understood by reference to the following Detailed Description considered in connection with the accompanying drawings, in which like reference numerals refer to identical or corresponding parts throughout, and in which.

DETAILED DESCRIPTION

Figure 1A:
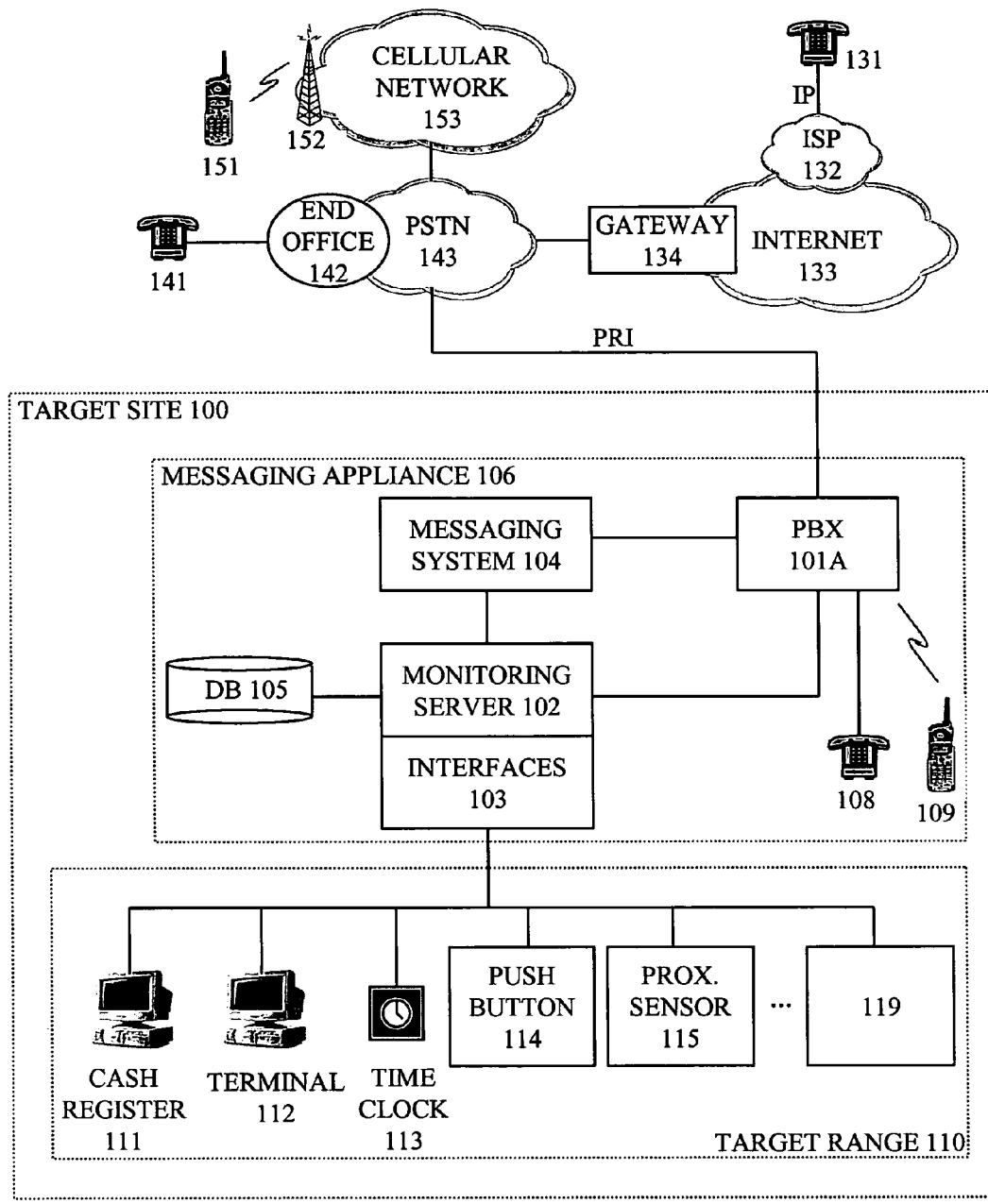
FIG. 1A illustrates a first embodiment of a presence indication arrangement, one involving a primary-rate interface (PRI) between a public switched telephone network (PSTN) and a target site's private branch exchange (PBX)

In describing embodiments illustrated in the drawings, specific terminology is employed for the sake of clarity. However, the invention is not intended to be limited to the specific terminology so selected, and it is to be understood that each specific element includes all technical equivalents that operate in a similar manner to accomplish a similar purpose. Various terms that are used in this specification are to be given their broadest reasonable interpretation when used to interpret the claims.

Moreover, features and procedures whose implementations are well known to those skilled in the art are omitted for brevity. For example, design, selection, and implementation of basic network elements and electronic circuit elements such as interfaces, signal level shifters, buffers, logic elements, communications links, and the like, lie within the ability of those skilled in the art, and accordingly any detailed discussion thereof may be omitted. Likewise, the steps involved in methods described herein may be readily implemented by those skilled in the art without undue experimentation.

Further, various aspects, features and embodiments of the presence indication arrangement may be described as a process that can be depicted as a flowchart, a flow diagram, a structure diagram, or a block diagram. Although a flowchart may describe the operations as a sequential process, many of the operations can be performed in parallel, concurrently, or in a different order than that described. Operations not needed or desired for a particular implementation may be omitted. A process or steps thereof may correspond to a method, a function, a procedure, a subroutine, a subprogram, and so forth, or any combination thereof.

To be more easily readable, this disclosure refers to an "employee" who is the object of a "call" to an "enterprise" placed by a "customer" over a "telephone network." However, it is to be understood that these terms are merely examples of broader envisioned concepts—a "target" whose status with respect to a "target site" or "target range" is indicated to an "outside entity" (or simply, "entity") who interrogates over a suitable communications medium:

- A "target" may be an individual person, a group or team of people, one or more pieces of equipment, and so forth.
- An "employee" need not be an employee in the strict definition of the term in labor law, but may include independent contractors, and so forth.
- A "target site" may be an individual site or store, an entire enterprise including multiple sites or stores, geographical or logical areas, and so forth.
- A "target range" may be the physical or logical range that a target may inhabit and be contacted by an entity, and may coincide with the target site. A hardware store employee's "target range" would likely be the particular hardware store at which he works where he would likely be sought by a customer. A target range could also be defined as a particular department in the store at which the employee works, or (for a district manager) the target range might be defined as a set of stores in his district.
- An "outside entity" (or simply "entity") may be, for example, a customer of the target site, or some other person or entity that requires information as to the status of the target with respect to the target site or target range, such as whether the target (employee) is presently at a given site (store).
- A suitable communications medium may include one or a combination of public switched telephone networks (PSTNs), a cellular telephone or other mobile communications provider, a local telephone exchange such as a private branch exchange (PBX), a private internet, the global Internet, and so forth.

FIG. 1A illustrates a first embodiment of a presence indication arrangement, one involving a primary-rate interface (PRI) between a public switched telephone network (PSTN) and a target site's private branch exchange (PBX).

For the present discussion it is assumed that a customer desires to contact an employee ("target") at a store location or enterprise generally indicated as target site 100. The employee is presumed to have an area, called a target range 110, in which roam while he can be contacted by customers or at least indicate that he can be contacted. In the case of most hardware store employees, the target range 110 occupies some or essentially all of a target site 100 because the employee may conceivably roam anywhere in the store but still be contacted.

A customer using one of telephones 131, 141, 151, and so forth, can call into a target site 100 through a variety of communications media. Assuming that the customer uses telephone technology to contact the target site, the communications media connect with a private telephone network associated with the enterprise. The private telephone network may comprise a private branch exchange (PBX) 101A or centrex (a PBX with all switching occurring at a local telephone office instead of at the enterprise's site).

Figure 1B:
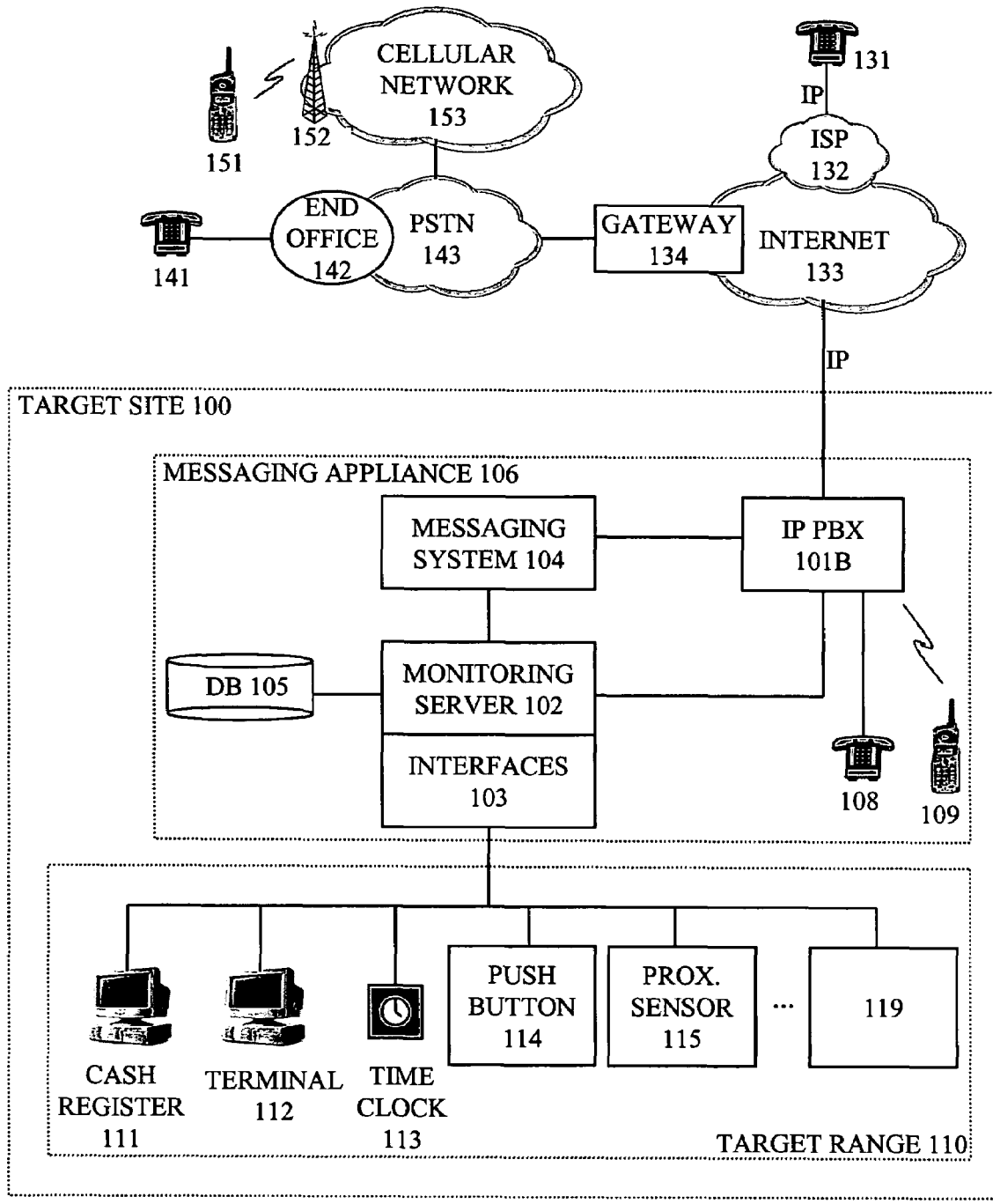
FIG. 1B illustrates a second embodiment of a presence indication arrangement, one involving an internet protocol (IP) interface between an outside network (such as the global Internet) and a target site's IP PBX.

More generally, PBXs connect with other networks using a variety of interfaces, including analog, T1/PRI, E1/PRI, BRI, IP, ATM, xDSL, frame relay, and so forth. FIG. 1A illustrates the conventional PRI interface to a public switched telephone network (PSTN) 143. But as IP and voice over IP become increasingly common, a new generation of PBX, dubbed IP PBX, has emerged. An IP PBX supports an IP interface so that calls can be received and sent out over an IP network, such as the Internet. FIG. 1B (described below) illustrates this IP interface between the IP PBX and the Internet.

Referring again to FIG. 1A, a customer may use telephone 131 to call in using voice-over-Internet technology, using an Internet service provider (ISP) 132 to access the Internet 133. The Internet is connected via a gateway 134 to public switched telephone network (PSTN) 143, which may be connected to the target site 100's PBX via a conventional primary-rate interface (PRI) interface. As known to those in the art, PRI is a service designed for larger organizations that is generally transmitted through a T-1 line (E1 line in Europe).

Alternatively, a customer may also use a telephone 141 to connect to the target site's PBX 101A through an end office 142 and the PSTN 143.

As yet another example, a customer may use a cellular phone or other portable communications device 151 to connect to the PSTN 143 via a cellular network 153 including a communications antenna 152. Such a call is routed through the PSTN 143 to the desired PBX 101A or equivalent device.

Customers or other outside entities may of course use devices other than 131, 141, 151, and communication media other than 132/133/134, 142/143, and 152/153, in order to connect to the target site 100.

In the illustrated embodiment, the PBX 101A or equivalent device is connected to a monitoring server 102 and to a messaging system 104 which may be a voice messaging system. The monitoring server 102 may be a general purpose computer or other suitable data processing apparatus that is programmed in accordance with the principles and methods described herein.

The monitoring server 102 may be connected to communicate with and control the messaging system 104. The messaging system 104 may be generally conventional in design, although features may be programmed or added to it in accordance with the present disclosure. For example, the voice messaging system may have messages stored therein which are summoned (sent to the customer) from within the messaging system itself or under control of monitoring server 102. Alternatively or additionally, messages may be stored within the monitoring server 102 or database 105, and sent out through the PBX or IP PBX, either directly or using the messaging system as a conduit. Messages may be pre-recorded, or they may be stored as text and fed to a voice synthesizer or other converter before being sent to the customer.

Monitoring server 102 is also connected to a database storage medium 105. For simplicity, the database itself may be referred to herein as element 105. Briefly, database 105 contains information related to at least one employee that defines at least the "status" (e.g., presence, absence) of that target (e.g., employee) with reference to his target range 110 and target site (e.g., store) 100. Preferably, the "status" does not merely involve a bare indication of an target employee's presence or absence, but also involves other useful information that give the customer an indication of why the target employee is unavailable and when the customer may expect his call to be returned.

In a particular embodiment in which target site 100 is an enterprise such as a retail establishment, database 105 contains a set of target (employee) identifiers that uniquely identify the targets (employees) that outside entities (e.g., customers of the enterprise) may desire to contact. Associated with each target identifier (employee identifier) is such information as:

- an indication of the employee's presence or absence
- a summary of the employee's general work schedule (for example, weekdays noon through 8:00 p.m.)
- an indication of the employee's title, department or other descriptive data (as general background information of use to incoming callers)
- (for when the employee is not present) an indication the employee's expected date and time of return
- (for when the employee is not present) a description of the nature of his absence (on lunch break, maternity leave, sick leave, or vacation; working at another store; and so forth)
- (for when the employee is not present) an indication of an alternative individual that callers might connect with in the employee's absence, along with any necessary instructions (e.g., extension number) for contacting that alternative individual
- an indication of how the database entry was arrived at (from time clock input, from the employee's use of a cash register, from the employee's history of making an outgoing telephone call from an extension reserved for that employee, from a history of log-ins to the enterprise's computer network using that employee's private password, subsequent logouts from the enterprise's computer network, and so forth)
- a history of recent incoming telephone calls to the employee's extension that have gone unanswered
- other information that may be of use to the incoming caller, store management, data systems analysts who design or maintain the information and programming for monitoring server 102 and database 105, and so forth.

Of course, less than all of this information may be destined for presentation to the customer that is calling. Programming within monitoring server 102 reserves some information, such as an employee's overall vacation schedule, for internal use, protecting it from disclosure to outside entities (customers).

More generally, programming within monitoring server 102 provides selectivity on which status information is provided to which customers. For example, based on the calling telephone number received through "Caller ID" services, monitoring server 102 provides more information to a recognized number (trusted caller) than to an unrecognized number (less trusted caller). An index of trusted callers (based on, for example, calling party number (CPN) numbers or passwords) is maintained in monitoring server 102 or in database 105. The index associates entity identifiers with an authorization level of corresponding entities (customers). Monitoring server 102 consults the index when an incoming call is received, and retains a caller's level of trustworthiness to affect the choice of which messages may be sent to the caller. The server qualifies the communication of the target's status to the entity based on the indicated authorization level of the entity.

Referring again to FIG. 1A, monitoring server 102 includes an array of interfaces collectively indicated as element 103. Each interface is connected to a respective sensing device 111 . . . 119. Sensing devices 111 . . . 119 provide monitoring server 102 with sensing information indicating the employee's activity (or lack of activity) as it relates to his presence (or absence) in the employee's target range 110.

Monitoring server 102 may obtain sensing information from sensing devices 111 . . . 119 by an suitable communication arrangement. For example, the monitoring server may periodically poll the sensing devices 111 . . . 119 to obtain sensing information that may be accumulating in the sensing devices. Alternatively, the sensing information may be obtained using an interrupt scheme, in which a sensing device interrupts the monitoring server only when it has new or additional sensing information to report. As a further alternative, a polling arrangement may be provided on some sensing devices and an interrupt scheme may be employed by other sensing devices.

In an application in which target site 100 is a retail store such as a hardware store, target range 110 is an abstract designation that may constitute the area in which the employee is expected to roam while he may still be expected to be contacted by a customer on, for example, a corded telephone 108 or a cordless communication device 109. The target range 110 may be defined as:

- the entire hardware store (target site 100)
- (as illustrated in FIG. 1A by way of non-limiting example) only a part of the store, such as: the plumbing department; all areas of the hardware store except management offices and data processing divisions; and so forth
- an area extending beyond the store (such as when the employee is in the parking lot but accessible by a cordless telephone 109).

Devices 111-119 are termed "sensing" devices because they participate in monitoring the presence of employees. However, in general, the devices first serve a primary purpose that is distinct from the sensing that they perform secondarily. For example, sensing devices may include:

- a cash register 111 that tells the monitoring server 102 when a given employee has opened the cash register with an employee-specific key, key card, password, or the like.
- a computer terminal 112 that primarily allows the employee to place orders or access the enterprise network or global Internet, and which tells the monitoring server 102 when a given employee has used the computer terminal using an employee-specific password, access code, or the like.
- a time clock 113 that primarily records the time of arrival and departure of the employee, and which provides arrival and departure information to the monitoring server.
- a push button device 114 that an employee may affirmatively push to indicate his presence to the monitoring server; a keyboard constitutes a more sophisticated push button device that allows the employee to be more specific as to the time and place of his presence or absence (e.g., temporarily in the lumber yard, leaving temporarily on a delivery, and so forth).

a proximity sensor 115 that uses appropriate technology, such as infrared sensors, wireless communications, or optical sensors in an employee's office or work area, or weight sensors in the employee's chair, and so forth, to passively sense the employee's presence and report it to the monitoring server; the employee does not have to take action to affirmatively or purposefully indicate his presence.

a further device 119 that communicates information to the monitoring server, other than those specifically enumerated above. For example: wireless phone usage, wireless pager activation, electronic calendar usage, and so forth.

Most devices communicate the employee's presence information "implicitly," that is, in addition to their primary function as a cash register 111, computer terminal 112, time clock 113, and so forth. With implicit communication devices, the employee does not have to affirmatively take action to indicate his presence, but may merely goes about his job using the devices according to their primary function. Implicit communication devices have the advantage that the employee does not have to possess the attitude and memory needed to timely communicate his presence.

The embodiment also envisions devices that communicate an employee's presence information "explicitly," that is, devices that communicate the employee's presence information as their primary function. Push button (keyboard) 114 is one such explicit presence information communication device. An employee must affirmatively decide to push the button (or use the keyboard) to communicate his presence at a given time and place, an approach that is more subject to human error or negligence than the implicit communication devices outlined above.

It is envisioned that one, or more than one, sensing devices may be present in a given installation. Programming within monitoring server 102 interprets the input from the sensing device(s) 111-119, and may give different weight or intelligent interpretation to the various inputs to arrive at a conclusion as to the employee's presence or absence. For example, if on Wednesday afternoon the monitoring server's most recent input concerning an employee was his punching in at a time clock at 8 a.m. the previous Friday without a subsequent punching out, along with analysis of the employee's scheduled vacation beginning the following Monday, the monitoring server can conclude that the employee is in fact absent despite the fact that he did not punch out.

FIG. 1B illustrates a second embodiment of a presence indication arrangement, one involving an internet protocol (IP) interface between an outside network (such as the global Internet) and a target site's IP PBX. FIG. 1B differs from FIG. 1A in that PBX 101A is replaced by IP PBX 101B. Also, IP PBX communicates directly with the Internet 133 via an internet protocol (IP) connection rather than with a public switched telephone network (PSTN) 143 via a PRI connection. The modified architecture merely alters the manner in which communication devices 131, 414, 151, and so forth, communicate with the target site. Thus, FIGS. 1A and 1B collectively demonstrate that a variety of network architectures are envisioned, especially with respect to the manner in which the outside entity (customer) communicates with the target site (enterprise or store).

The hardware architecture illustrated FIGS. 1A and 1B should not limit the invention. For example, it is envisioned that the PBX could be a centrex located off the enterprise's location (target site 100). Further, database 105 may be implemented as an integral part of monitoring server 102 rather than as a element separate from it.

More generally, the functions of one or more of the PBX 101A (or IP PBX 101B), monitoring server 102, interfaces 103, messaging system 10, and database 105 may be integrated within a single unit, such as a messaging appliance 106. Here, the term "appliance" does not imply small size, limited functionality, or inflexible functionality. One or more sensing devices may be integrated into the messaging appliance, though not shown specifically in FIGS. 1A, 1B. Unit 106 may be implemented as a personal or desktop computer or server (such as for homes or small enterprises) or larger computing devices or networked computing devices (such as for larger enterprises). Such apparatus incorporate appropriate interfaces and programmed functionality that have described herein with respect to embodiments having separate elements.

Accordingly, the particular architecture that is presented in FIGS. 1A and 1B for purposes of explanation of operation should not limit the scope of the invention.

Figure 2:
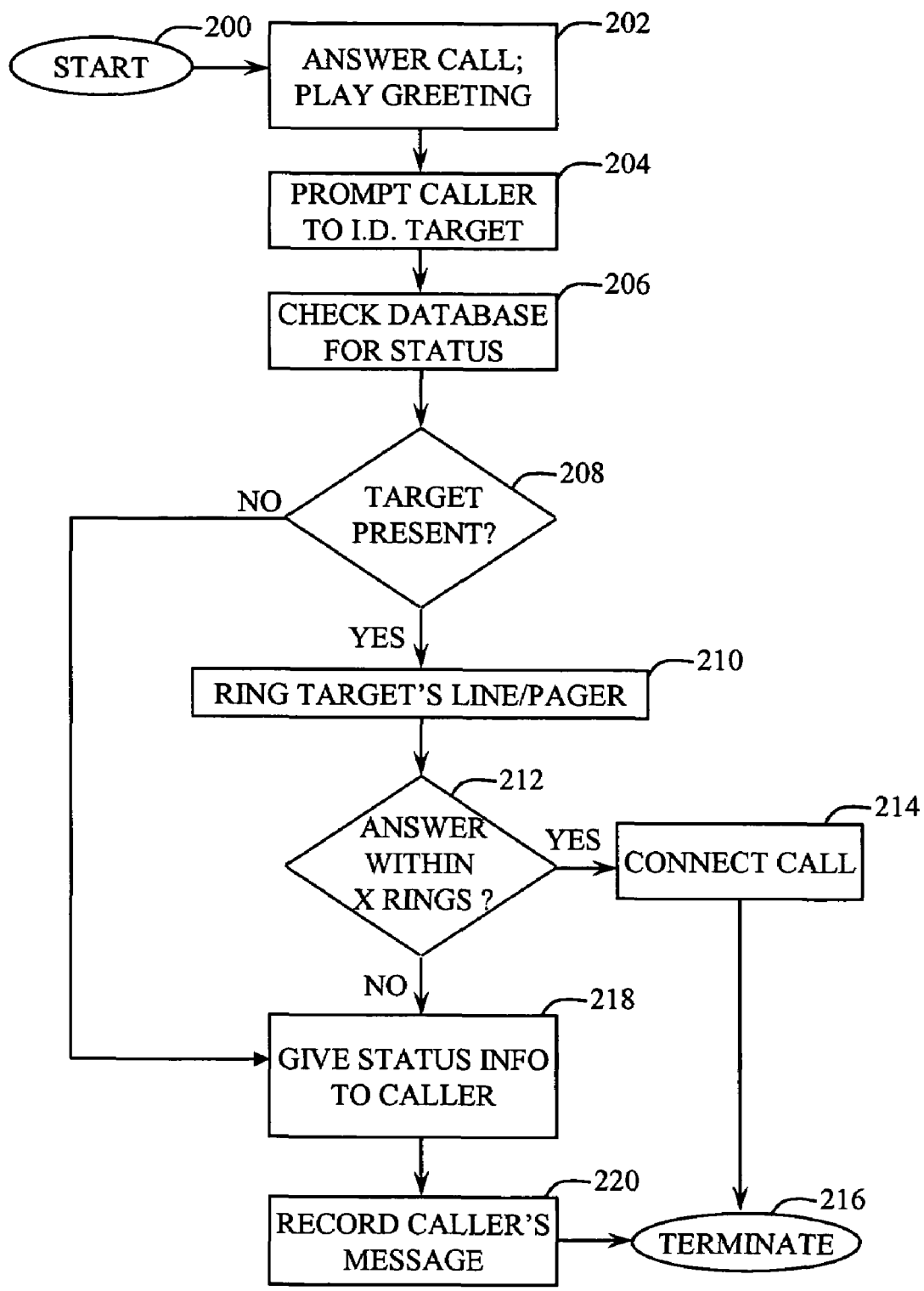
FIG. 2 is a flowchart illustrating an embodiment of a method for indicating the presence or absence of a target such as an individual, an embodiment that may be implemented on the architecture of FIGS. 1A and 1B.

FIG. 2 is a flowchart illustrating an embodiment of a method for indicating the presence or absence of a target such as an individual, an embodiment that may be implemented on, for example, the architectures of FIGS. 1A and 1B.

Block 200 indicates initiation of the process.

Block 202 indicates how the voice messaging system 104 answers an incoming customer call through PBX 101A or 1P PBX 101B, and plays a greeting or other announcement.

Block 204 indicates how the voice messaging system 104 prompts the customer for the name of the desired employee (or other identifying information such as the employee's extension number), and receives the customer's response. The ability to prompt callers and interpret their response, using touch-tone technology or voice recognition techniques, is known in the art and need not be described in further detail.

Block 206 indicates that monitoring server 102 uses the voice messaging system's indication of the employee being called, and checks database 105 for information as to the called employee's "status." The status information may constituting a simple indication of his presence or absence, or it may involve more complex information as described above, with reference to database 105.

Block 208 indicates how monitoring server 102 makes a decision as to whether the called employee is present. If the called employee is deemed not to be present, then control passes to block 218, described below. However, if the called employee is deemed to be present, then control passes to block 210.

Block 210 indicates how the monitoring server 102 causes the employee's extension to ring, using PBX/IP PBX 101A/101B and/or voice messaging system 104, depending on the particular implementation chosen. Block 210 may also involve other attempts to contact the employee, such as by an automated paging system.

Block 212 indicates how the PBX/IP PBX 101A/101B and voice messaging system determine if the employee's extension has been answered after a given number "X" of rings.

If the employee's extension is answered quickly enough, then control passes to block 214 which indicates that the employee's extension is connected to the calling customer. Block 216 indicates termination of the process.

However, if it is determined that the employee's extension was not answered quickly enough, then control passes to block 218.

Block 218 indicates how voice messaging system 104 plays an outgoing message indicating that the employee's extension was not answered, supplementing it with additional personal presence information that explains the situation to the user. For example, one message may include: "Mr. Smith has not answered his extension, but is believed to be at work today until 5 p.m. You may leave Mr. Smith a message after the tone or dial 0 for a live operator." Such messages may be controlled on a call-by-call basis by the monitoring server 102; alternatively they may be preprogrammed into the voice messaging system 104.

Block 220 indicates how the voice messaging system records any message that the customer chooses to leave for the employee.

Block 216 indicates termination of the process.

Of course, those skilled in the art will recognize that the method of FIG. 2 may be performed on systems with architectures that differ from FIGS. 1A and 1B.

Also provided, for the methods described herein, are computer program products (such as storage media) storing program instructions for execution on a computer system having at least one data processing device, which instructions when executed by the computer system cause the computer system to perform the methods described herein.

Further provided are systems for performing the methods described herein, the systems including at least one data processing element. Generally, these elements may be implemented as any appropriate computer(s) employing technology known by those skilled in the art to be appropriate to the functions performed. The computer(s) may be implemented using a conventional general purpose computer programmed according to the foregoing teachings, as will be apparent to those skilled in the computer art. Appropriate software can readily be prepared by programmers based on the teachings of the present disclosure. Suitable programming languages operating with available operating systems may be chosen.

General purpose computers may implement the foregoing methods, in which the computer housing may house a CPU (central processing unit), memory such as DRAM (dynamic random access memory), ROM (read only memory), EPROM (erasable programmable read only memory), EEPROM (electrically erasable programmable read only memory), SRAM (static random access memory), SDRAM (synchronous dynamic random access memory), and Flash RAM (random access memory), and other special purpose logic devices such as ASICs (application specific integrated circuits) or configurable logic devices such GAL (generic array logic) and reprogrammable FPGAs (field programmable gate arrays).

Each computer may also include plural input devices (for example, keyboard, microphone, and mouse), and a display controller for controlling a monitor. Additionally, the computer may include a floppy disk drive; other removable media devices (for example, compact disc, tape, and removable magneto optical media); and a hard disk or other fixed high-density media drives, connected using an appropriate device bus such as a SCSI (small computer system interface) bus, an Enhanced IDE (integrated drive electronics) bus, or an Ultra DMA (direct memory access) bus. The computer may also include a compact disc reader, a compact disc reader/writer unit, or a compact disc jukebox, which may be connected to the same device bus or to another device bus.

The arrangement provides at least one computer readable medium. Examples of computer readable media include compact discs, hard disks, floppy disks, tape, magneto optical disks, PROMs (for example, EPROM, EEPROM, Flash EPROM), DRAM, SRAM, SDRAM.

Stored on any one or on a combination of computer readable media is software for controlling both the hardware of the computer and for enabling the computer to interact with other elements, to perform the functions described above. Such software may include, but is not limited to, user applications, device drivers, operating systems, development tools, and so forth.

Such computer readable media further include a computer program product including computer executable code or computer executable instructions that, when executed, causes a computer to perform the methods disclosed above. The computer code may be any interpreted or executable code, including but not limited to scripts, interpreters, dynamic link libraries, Java classes, complete executable programs, and the like.

From the foregoing, it will be apparent to those skilled in the art that a variety of methods, systems, computer programs on recording media, and the like, are provided.

The foregoing description provides support for an arrangement for indicating a status of a target to an entity (131, 141, 151 . . . ) that attempts to communicate with the target. The arrangement may include at least one sensing device (111-119) configured to provide sensing information concerning the target's status in response to an action of the target with respect to the sensing device (111-119). The arrangement may also include a monitoring device (102), configured to receive the sensing information from the at least one sensing device (111-119), and to govern communication to the entity of the target's status, the status describing at least the target's present and future ability to communicate with the entity.

The target may be a person; the status may include an indication of whether the person is present or absent; a particular sensing device (such as 111, 112, 113) may be configured to perform both (A) a primary function that is not related to providing the sensing information, and (B) a secondary function of providing the sensing information; and the particular sensing device (such as 111, 112, 113) may provide the sensing information in response to the person's use of the particular sensing device (such as 111, 112, 113) to perform the particular sensing device's primary function, so that the person does not have to explicitly perform any purely presence related action in order to cause the particular sensing device to communicate the sensing information.

The particular sensing device may be one of a group including a cash register (111), a computer terminal (112), and a time clock (113).

The arrangement may further include a database, operatively connected to the monitoring device, and configured to store status information concerning the target.

The database may be configured to store status information from a group including an indication of the person's presence or absence; a summary of the person's general work schedule; an indication of the employee's title, department or other descriptive data; an indication the person's expected date and time of return; a description of the nature of the person's absence; an indication of an alternative individual that callers might connect with in the employee's absence; an indication of how the database entry was arrived at; and a history of recent incoming calls to the employee's extension that have gone unanswered.

The target may be a person; the status may include an indication of whether the person is present or absent; a given sensing device (such as 114, 115) may be dedicated to only providing the sensing information to the monitoring device; and the person must explicitly perform a presence-related action in order to cause the given sensing device to provide the sensing information.

The given sensing device may be a person-operated device (114) requiring an explicitly presence-related action to be performed by a person in order to provide the sensing information, and the person-operated device (114) may be from a group including a touch-screen, a push-button, and a keyboard.

The given sensing device may be a proximity sensor configured to passively sense a physical presence of the person without the person's explicit performance of any explicitly presence-related action, and the proximity sensor may be from a group including an infrared detector, an optical detector, and a weight detector.

The monitoring device (102) may include a qualifying portion configured to consult an index that associates entity identifiers with an authorization level of corresponding entities, and to qualify the communication of the target's status to the entity based on the indicated authorization level of the entity.

The foregoing description further supports a method of indicating a status of a target to an entity (131, 141, 151 ...) that attempts to communicate with the target. The method includes automatically providing sensing information concerning the target's status in response to an action of the target with respect to a sensing device (111-119), and, based on the sensing information from the at least one sensing device (111-119), governing communication to the entity of the target's status, the status describing at least the target's present and future ability to communicate with the entity.

The target may be a person; the status includes an indication of whether the person is present or absent; a particular sensing device (such as 111, 112, 113) may be configured to perform both (A) a primary function that is not related to providing the sensing information, and (B) a secondary function of providing the sensing information; and the providing step may include providing the sensing information in response to the person's use of the particular sensing device (such as 111, 112, 113) to perform the particular sensing device's primary function, so that the person does not have to explicitly perform any purely presence related action in order to cause the particular sensing device to communicate the sensing information.

The target may be a person; the status includes an indication of whether the person is present or absent; a given sensing device (such as 114, 115) is dedicated to only providing the sensing information to the monitoring device; and the providing step may include providing the sensing information in response to an explicitly presence-related action that the person must perform in order to cause the given sensing device to provide the sensing information.

The method may further include accumulating sensing information to form status data that is stored in a database; and using the status data from the database to govern communication of the target's status to the entity.

The method may further include consulting an index that associates entity identifiers with an authorization level of corresponding entities; and qualifying the communication of the target's status to the entity based on the indicated authorization level of the entity.

The foregoing description further supports a computer program product including computer executable code or computer executable instructions that, when executed, causes a computer to perform the governing steps of the methods described above.

The foregoing description further supports a system configured to perform the methods described above.

Many alternatives, modifications, and variations will be apparent to those skilled in the art in light of the above teachings. For example, the relative location of elements such as servers, databases PBXs, voice messaging systems and sensing devices may be varied while remaining within the scope of the present invention. Likewise, the steps involved in methods described herein may be implemented in a manner different than as described above. Moreover, it is recognized that elements may be located at different relative locations than as specifically disclosed herein. Further, use of various sensing devices other than those mentioned above, lies within the contemplation of the invention. It is therefore to be understood that within the scope of the appended claims and their equivalents, the invention may be practiced otherwise than as specifically described herein.

What is claimed is:

1. An arrangement for indicating a status of a target to an entity that attempts to communicate with the target, the arrangement comprising:

at least one sensing device configured to provide sensing information concerning the target's status in response to an action of the target with respect to the sensing device, wherein the target includes a person;

a monitoring device, configured to receive the sensing information from the at least one sensing device, and to govern communication to the entity of the target's status, the status describing at least the target's present and future ability to communicate with the entity, wherein the status includes an indication of whether the person is present or absent;

wherein the monitoring device includes a qualifying portion configured to consult an index that associates entity identifiers with an authorization level of corresponding entities, and to qualify the communication of the target's status to the entity based on the indicated authorization level of the entity;

wherein a given sensing device is dedicated to only providing the sensing information to the monitoring device; and wherein the person must explicitly perform a presence-related action in order to cause the given sensing device to provide the sensing information.

2. The arrangement of claim 1, wherein the given sensing device is a person-operated device requiring an explicitly presence-related action to be performed by a person in order to provide the sensing information, the person-operated device being from a group including:

a touch-screen;

a push-button; and a keyboard.

3. A method of indicating a status of a target to an entity that attempts to communicate with the target, the method comprising:

automatically providing sensing information concerning the target's status in response to an action of the target with respect to a sensing device, wherein the target includes a person;

based on the sensing information from the at least one sensing device, governing communication to the entity of the target's status, the status describing at least the target's present and future ability to communicate with the entity, wherein the status includes an indication of whether the person is present or absent;

consulting an index that associates entity identifiers with an authorization level of corresponding entities;

qualifying the communication of the target's status to the entity based on the indicated authorization level of the entity;

wherein a given sensing device is dedicated to only providing the sensing information to the monitoring device; and the providing step includes providing the sensing information in response to an explicitly presence-related action that the person must perform in order to cause the given sensing device to provide the sensing information.

* * * * *